(12) United States Patent
Beauchamp

(10) Patent No.: US 9,710,360 B2
(45) Date of Patent: Jul. 18, 2017

(54) OPTIMIZING ERROR PARSING IN AN INTEGRATED DEVELOPMENT ENVIRONMENT

(71) Applicant: Serge Beauchamp, Truro (GB)

(72) Inventor: Serge Beauchamp, Truro (GB)

(73) Assignee: NXP USA, Inc., Austin, TX (US)

( * ) Notice: Subject to any disclaimer, the term of this patent is extended or adjusted under 35 U.S.C. 154(b) by 358 days.

(21) Appl. No.: 13/929,002

(22) Filed: Jun. 27, 2013

(65) Prior Publication Data

US 2015/0007139 A1   Jan. 1, 2015

(51) Int. Cl.
G06F 11/36    (2006.01)
G06F 11/07    (2006.01)

(52) U.S. Cl.
CPC ...... *G06F 11/3664* (2013.01); *G06F 11/0706* (2013.01); *G06F 11/0781* (2013.01)

(58) Field of Classification Search
None
See application file for complete search history.

(56) References Cited

U.S. PATENT DOCUMENTS

| | | | |
|---|---|---|---|
| 5,790,778 A * | 8/1998 | Bush et al. ............... | 714/38.1 |
| 6,901,583 B1 * | 5/2005 | Park .......................... | 717/134 |
| 2004/0205415 A1 * | 10/2004 | Snover et al. ............. | 714/45 |
| 2005/0091586 A1 * | 4/2005 | Snover et al. ............. | 715/517 |
| 2005/0223363 A1 * | 10/2005 | Black-Ziegelbein | G06F 11/3624 717/127 |
| 2006/0036874 A1 * | 2/2006 | Cockerille et al. ....... | 713/187 |
| 2006/0080646 A1 * | 4/2006 | Aman ....................... | 717/143 |
| 2006/0136914 A1 * | 6/2006 | Marascio ............. | G06F 11/3664 718/100 |
| 2006/0282897 A1 * | 12/2006 | Sima ................... | G06F 11/3664 726/25 |
| 2007/0043871 A1 | 2/2007 | Sweedler et al. | |
| 2009/0138861 A1 | 5/2009 | Terpolilli | |
| 2010/0057735 A1 | 3/2010 | Srinivasan et al. | |
| 2012/0191446 A1 | 7/2012 | Binsztok et al. | |
| 2013/0152047 A1 * | 6/2013 | Moorthi ............. | G06F 11/368 717/124 |

\* cited by examiner

*Primary Examiner* — Tuan Dao

(57) ABSTRACT

A system to enable an integrated development environment to efficiently parse error expressions generated by tools used to generate processing environment-specific executable code, where the tools are external to the integrated development environment, is provided. The system groups error parsers configured to parse the error expressions into two groups: error parsers that handle output from a tool using a single output line of regular expression, and error parsers that require something more than a single output line of regular expression to determine the nature of an error. Embodiments of the system can determine whether a particular output regular expression should be analyzed by a selected set of the error parsers by comparing the output regular expression against a concatenated list of all the regular expressions corresponding to those error parsers that handle output from the tool using a single output line of regular expression.

13 Claims, 5 Drawing Sheets

NORMAL BUILD PROCESS

NEW BUILD PROCESS

OPTIMIZING ERROR PARSING IN AN INTEGRATED DEVELOPMENT ENVIRONMENT

BACKGROUND

Field

This disclosure relates generally to error handling in an integrated development environment, and more specifically, to efficiently handling errors generated by tools used to generate processing environment-specific executables, where the tools are external to the integrated development environment.

Related Art

An integrated development environment (IDE) provides a suite of facilities for development of software. Typical IDEs include facilities such as a source code editor, build automation tools, and a debugger. A goal of an IDE is to provide a single user interface for the variety of components used for authoring, modifying, compiling, deploying, and debugging software. Further, the IDE presents the components as a cohesive unit, thereby not only improving productivity, but also improving learning time for developers.

In traditional IDEs, the environment also includes compilers, interpreters, assemblers, and the like, which are used to generate processing environment-specific executable code. These tools are executed in the environment presented by the IDE and provide their output directly to the IDE environment. Thus, any error indications from the various tools are displayed by the interfaces presented by the IDE environment. But, in order to incorporate such tools within the IDE, a binary interface must be provided for each tool to enable interaction. There can be significant programming overhead to generate those interfaces for each new tool desired to be included in the IDE, which limits ease of expansion.

Alternatively, IDEs can use tools that are outside the environment, which then execute as in response to command line entries (e.g., through use of a makefile). This avoids the need to generate a binary interface between the IDE and the external tool, and thereby enhances expandability and utility. These external tools can return output strings in the form of responses to the command line entry. Each output string should then be interpreted and provided back to the IDE in some way, so that a developer can respond to any errors presented by the output strings. Typically, this interpretation is performed by a set of error parsers that examine the output string to determine whether there is a match to an error expression. One problem with such an approach is that for complex builds, many commands for many external tools can be used, and there can be many output strings generated, some of which include error indicators and many of which do not. Nonetheless, each expression is examined by each error parser until it is determined that there is a match or not. Thus, there can be significant overhead associated with examining each output string by each error parser. In some cases, this overhead can be several times longer than the processing time of the build tools themselves.

It is therefore desirable to provide an integrated development environment that can utilize external tools for ease of expansion, but analyze the output of those tools in a manner that is efficient, thereby improving the overall processing time of the IDE and reducing the resources needed during development.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

A system is provided that enables an integrated development environment to efficiently parse error expressions generated by tools used to generate processing environment-specific executable code, where the tools are external to the integrated development environment. The system groups error parsers configured to parse the error expressions into two groups: error parsers that handle output from a tool using a single output line of regular expression (e.g., stateless error parsers), and error parsers that require something more than a single output line of regular expression to determine the nature of an error (e.g., stateful error parsers that use multiple lines of regular expression to update the state). Embodiments of the system can determine whether a particular output regular expression should be analyzed by a selected set of the error parsers by comparing the output regular expression against a concatenated list of all the regular expressions corresponding to those error parsers that handle output from the tool using a single output line of regular expression.

Figure 1:
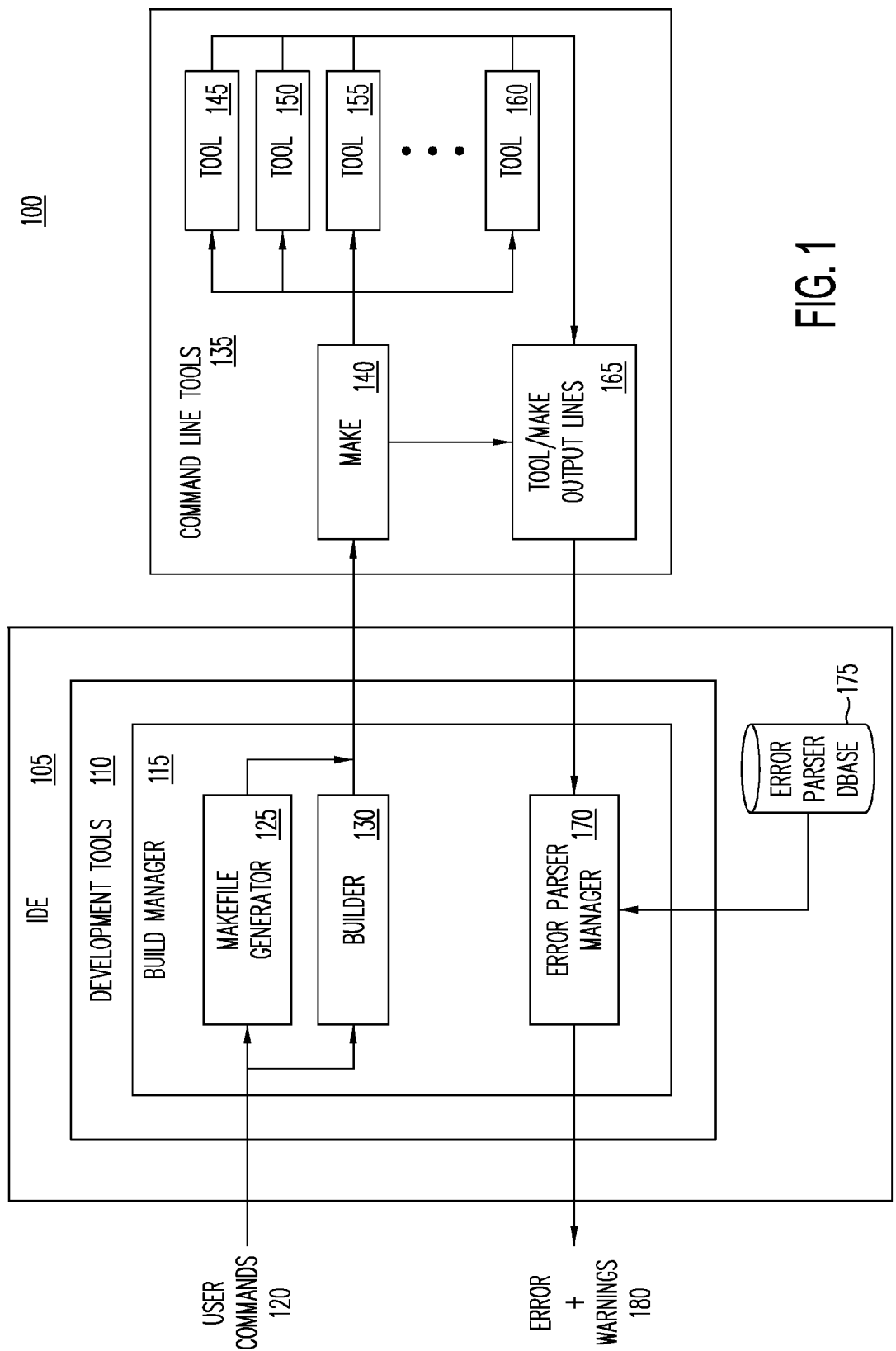
FIG. 1 is a simplified block diagram illustrating an example development system incorporating an integrated development environment (IDE) configurable to use with embodiments of the present invention.

FIG. 1 is a simplified block diagram illustrating an example development system incorporating an integrated development environment (IDE) configurable to use with embodiments of the present invention. Development system 100 includes an integrated development environment 105 communicatively coupled to one or more sets of command line tools 135 that are external to integrated development environment 105. Integrated development environment 105 can provide a suite of development tools 110 to aid in the development of software by a user. Development tools 110 provided by integrated development environment 105 can include, for example, one or more source code editors, build automation tools, and debuggers (not shown).

Build automation tools can also include a build manager 115 that coordinates tasks related to building executable versions of the code being developed in the IDE. In order to provide executable versions of code for various different processing environments, the source code may be subject to pre-compilation processing, then processed by a compiler or assembler depending on the nature of the code, and linked to libraries or other object code. In addition, information regarding the nature of the target processing environment that ultimately will be executing the code can determine those command line tools used to generate the executable version.

The IDE can collect relevant build information in a "project," including source files, data files, libraries and build settings. The selection of the project information is informed by an identification of the target processing environment for the ultimate executable code. From that project information, a makefile is generated using makefile generator 125 that will produce desired artifacts by invoking command line tools from a set of command line tools 135. Build manager 115 can use information regarding the code being developed and target processing environment to determine those tools needed to perform the various tasks, as well as other portions of code that are necessary to link to the source code version being modified. Build manager 115 can then provide that information to a makefile generator 125 to gather together the commands necessary to build the target-specific executable version of the code (i.e., generate a makefile), and call builder 130 to invoke make tool 140 in the appropriate command line tools set 135 along with passing other options to the make tool.

In traditional IDEs, many, if not all, of the tools necessary to generating executable versions of the code are incorporated in the IDE itself. In such cases, any output generated by the tools is provided directly to the IDE and is handled by the IDE—either displaying the information or relating the information to portions of the code (e.g., in the source code editor). But in order to incorporate a tool in the IDE, an interface needs to be provided between the tool and the IDE in order for information to be passed between them. A certain amount of overhead is involved in providing that interface, which can prevent certain tools from being included in an IDE.

If an IDE interacts with tools outside the integrated development environment, those tools provide their output as an output string. Those output strings can include error information that is needed by the IDE to present to the developer for response. Thus, a facility to read and interpret the output strings from the tools and provide interpreted information to the IDE is used, which can then relate that information to the developer.

FIG. 1 provides an example of a system where the tools used by the IDE are external to the integrated development environment in a set of command line tools 135. Build manager 115 uses information from the project to select a set of command line tools 135 to build the executable version of the code for a target processing environment. Command line tools environment 135 can be provided by a computing system distinct from the computing system providing IDE 105 within development system 100 or by the same system. There can be a plurality of selected command line tools, each supporting one of a variety of processors, platforms and architectures. The set of command line tools is chosen to provide an executable code appropriate for the target processing environment, including the type of processor, peripherals, and the like.

The build information is provided from IDE 105 to the set of command line tools 135. In one example, the build information is input to a make utility 140. Using the makefiles provided by the IDE along with other build-specific information, the make utility can automatically build the desired executable files for the desired platform. A makefile provides the various rules necessary to properly building the executable versions of the code (e.g., the command lines that define how to transform the various components of the code into target output). In response to makefile commands, make utility 140 calls one or more command line tools 145, 150, 155, and 160 to act upon the code components. Command line tools 145, 150, 155, and 160 can take a variety of forms depending upon the nature of the code and the desired end product. For example, a preprocessor tool can be called to act upon preprocessor directives provided in the source code prior to compiling the code. As discussed above, depending on the nature of the code a compiler tool or an assembler tool can be called to process the code, and additionally a linker tool or other tools can be called upon to process the output product from the compiler tool and assembler tool to generate target processing environment-specific executables. A tool chain is the set of command line tools (e.g., 145, 150, 155, and 160) called upon by make utility 140 to generate the executable version of the code.

As discussed above, each command line tool can provide one or more output strings that describe the results of the processing done by the command line tool on the code. These output strings can include error expressions that indicate a type of error encountered and the cause of that error, as generated by the command line tool, along with an identifier of the command line tool that generated the error expression. In addition, the make utility can generate error messages if the makefiles or other inputs to the make utility contain errors. In a command line environment, these error expressions would be provided to the screen for the person using the utility to interpret. Since the make utility, along with the various tools, are being called by the IDE, these error expressions need to be collected and provided to the IDE for analysis, display, and response. In one embodiment, these output lines can be collected in a Tool/Make Output Lines buffer 165 and communicated to an error parser manager 170 in the IDE. As will be discussed in greater detail below, error parser manager 170 can then apply a variety of applicable error parsers (e.g., error parsers stored in error parser database 175) to the output strings in order to determine whether an output line contains an error message and, if so, the nature of the error message. The error parsers utilized by error parser manager 170 can be selected from error parser database 175, at least in part, in light of the set of command line tools utilized. Error parser manager 170 can then provide information 180 regarding errors and warnings generated by the various tools.

As discussed above, error parsers are used to interpret error messages generated by the command line tools used. The error parsers can read the output strings provided by the command line tools and compare those output strings to expected patterns. Each command line tool can have a set of error parsers, where each error parser is configured to interpret one or more error messages generated by the tool. Error parsers can typically be identified as one of two types: those that require only one output line from a tool to determine the nature of an error, and those that require more than one output line from a tool to determine the nature of the error. Those in the former category are typically "stateless" error parsers; that is, they require no additional information to determine the nature of the error other than the information provided in the specific output line. Those in the latter category are typically "stateful" error parsers; that is, they require additional information provided in lines previous to the line containing the error message in order to determine the nature of the error. In most instances involving generating executable code by an IDE, the number of stateless error parsers is significantly greater than the number of stateful error parsers (e.g., three to four times as many).

Figure 2:
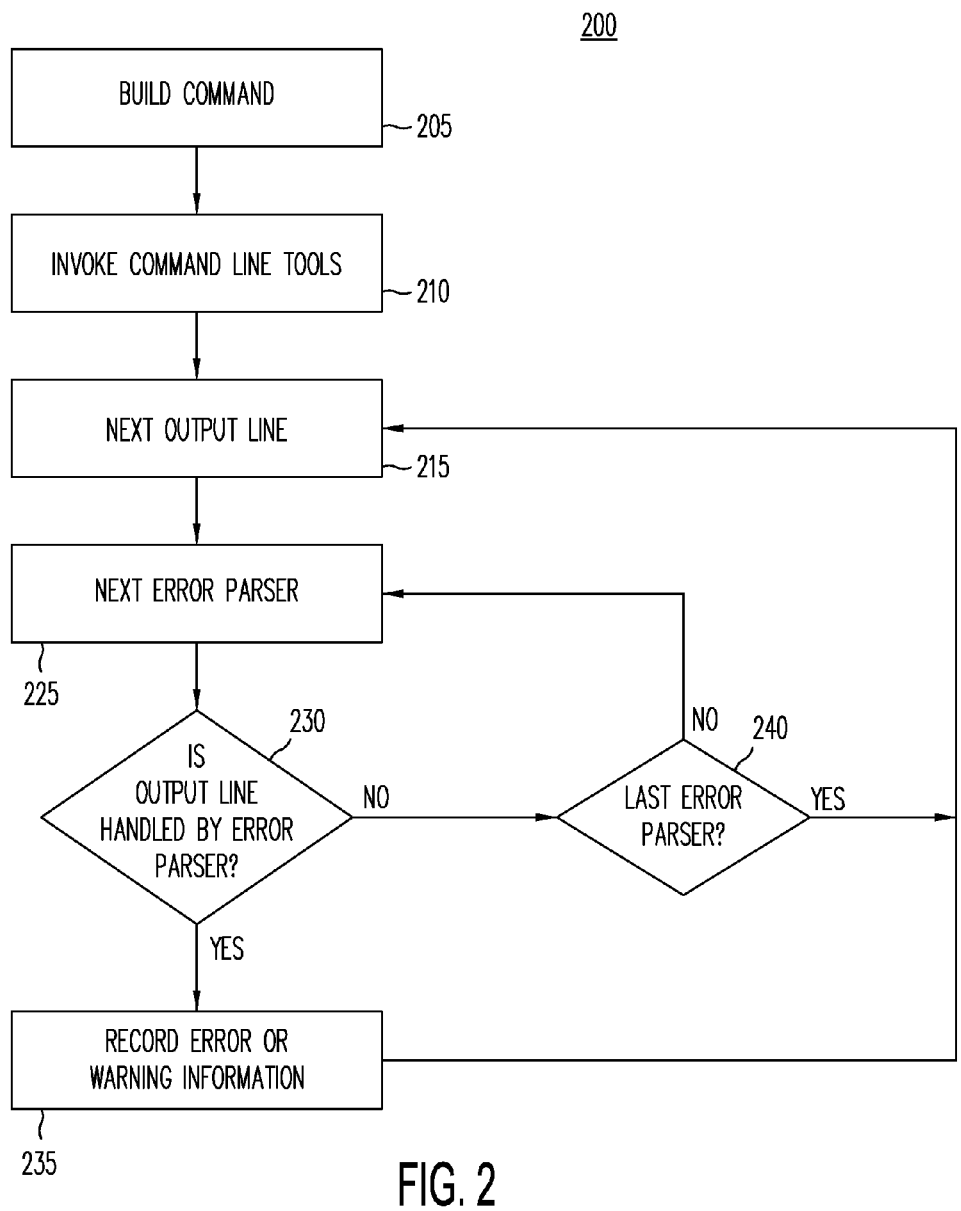
FIG. 2 is a simplified flow diagram illustrating an example of output string checking for errors, in accord with embodiments of the prior art.

FIG. 2 is a simplified flow diagram illustrating an example of output string checking for errors, in accord with embodiments of the prior art. As discussed above, elements of output string checking flow 200 can be performed by a variety of elements illustrated in FIG. 1. A build command can be executed by, for example, make utility 140 (205). This build command causes make utility 140 to invoke one or more command line tools (210). Each command line tool can generate a series of output lines containing output strings. As each output line generated by the command line tool is analyzed (215), an error parser is applied to the output line (225). The tasks of selecting an output line for evaluation and the error parser for performing the evaluation can be performed by error parser manager 170, for example. When the error parser is applied to the output string, a determination is made as to whether the output line is handled by the error parser (230). If the output line is handled by the error parser, then a recordation can be made of the nature of the error or warning included in the output string (235). For example, information can be stored or provided that includes an identification of the command line tool that generated the error, the line of code that generated the error, and other informational description provided in the output string or by the error parser itself. Once the error information has been recorded, the process can continue for analysis of the next output line.

If the output line is not handled by an error parser (230), then there is no error in the output line that corresponds to the particular error parser (e.g., for a stateless error parser), or that the error parser requires additional information to determine whether there is an error (e.g., for a multi-line, or stateful, error parser). So a next error parser should be selected to analyze the output line. A determination can first be made to determine whether the last error parser has been used on the output line (240). If not, then a next error parser can be selected (225) and the analysis process repeats. If the last error parser has been reached, this means that the output line contains no error expressions, and the process can continue to the next available output line for analysis.

This process of applying error parsers to each output line can be resource intensive. In some complex examples in which there are many command line tools being applied for generation of executable code and each command line tool has a multitude of error parsers, the time spent in analyzing output lines for errors can take many times longer than the processing time for the command line tools themselves. Much of this time is spent analyzing output lines that contain no error indications at all.

Figure 3:
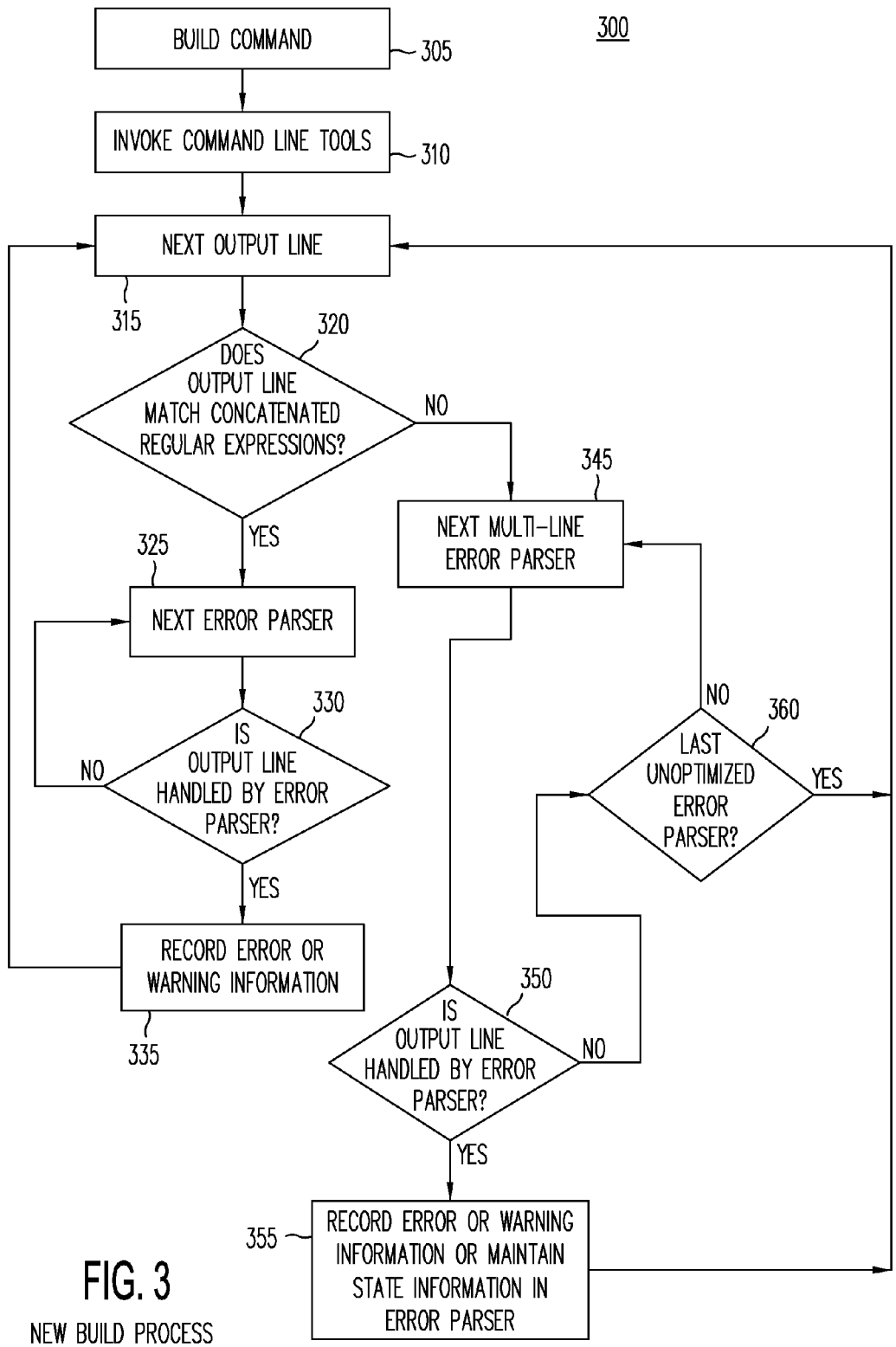
FIG. 3 is a simplified flow diagram illustrating an example of an improved method for applying error parsing to tool output, in accord with embodiments of the present invention.

FIG. 3 is a simplified flow diagram illustrating an example of an improved method for applying error parsing to command line tool output, in accord with embodiments of the present invention. The flow illustrated in FIG. 3 takes advantage of the nature of the error parsers discussed above, along with the difference in number of single line analysis and multi-line analysis error parsers and the fact that most output lines should have no error indications in them, to improve the efficiency of error parsing analysis. As discussed above, stateless error parsers belong to a class of error parsers that can determine the nature of an error by comparing a regular expression in a single line of output from a command line tool. Each single output line that contains an error will have a specific regular expression that triggers the error parser. Thus, a determination can be made as to whether an output line contains any stateless error message for a command line tool chain by comparing that output line against a concatenated regular expression containing all of the trigger expressions for the tool chain. If there is a hit on the comparison, then the output line contains at least a stateless error message. If there is not a hit on the comparison, then the output line necessarily does not contain a stateless error message.

As with FIG. 2, a build command can be executed by make utility 140 (305). This build command causes make utility 140 to invoke a command line tool (e.g., from a set of command line tools 135) (310). An output line is selected for analysis (315), and a determination is then made as to whether the output line contains any matches for the concatenated regular expression of stateless error messages (320). If there is a match, then the process continues much as in the process for FIG. 2. One of a single line, or stateless, error parser or a multi-line, or stateful, error parser is selected to analyze the output line (325) and a determination is made as to whether the output line is handled by the selected error parser (330). If the output line is handled by the error parser, then a recordation is made of the information in the error or warning provided in the output line (335) and that information can be provided to the IDE. The process can then continue to the next output line. If the output line is not handled by the current error parser (330), then a next error parser is selected to analyze the output line (325). Since the determination is made at step 320 as to whether the output line includes a single line error message handled by at least one of the single line error parsers, the output line should be handed by at least one of the single line error parsers; that is, the output line will reflect a single-line (e.g., stateless) error message.

If a determination is made that the output line does not contain any matches for the concatenated regular expression of single-line error messages (320), then the output line is subjected to analysis by only the multi-line, or stateful, error parsers; that is, the line will either contain a portion of a multi-line error message indication or there will be no error indicated in the output line. A multi-line error parser is selected to analyze the output line (345). If the output line is handled by the error parser (in the contextual light of previously analyzed lines) (350), then a recordation is made of the error or warning provided by the error parser (355), along with the state information needed by the IDE to accurately describe the nature of the error or warning. Alternatively, if the output line is used by the error parser to build a record of the state of the process, that information is maintained by the error parser. A next output line is then processed (315). If the output line is not handled by the current error parser (350), then a determination can be made if the last error parser has been utilized (360), and if not, then a next multi-line error parser is applied to the output line (345). If the last error parser has been applied to the output line (360), then a next output line is selected for analysis (315), and the process repeats.

In this loop, if there are no hits by error parsers on an output line (for either state or error information), then that means the output line contains no recognized error indication or needed state information. Since the set of multi-line/stateful error parsers is much smaller than the set of single line/stateless error parsers, this means that output lines having no error indications are subject to significantly less analysis, thereby saving time. This is reinforced because a single regular expression comparison (320) of a concatenated list takes significantly less processing resources than performing multiple regular expression comparisons in each error parser of the single line error parsers.

By now it should be appreciated that there has been provided a method for generating code executable in a target processing environment. The method includes: processing a first command line by a first processor where the first command line is generated by an integrated development environment and processing the first command line executes a command line tool as a step to produce code executable by the target processing environment and generates one or more output entries; determining whether the one or more output entries correspond to a first class of error identifiers; if the one or more output entries correspond to the first class of error identifiers then determining an error identifier of the first class of error identifiers corresponding to the one or more output entries and providing information corresponding to the error identifier and the one or more output entries to the IDE; and if the one or more output entries do not correspond to the first class of error identifiers and if the one or more output entries correspond to one of a second class of error identifiers then providing information corresponding to the one of the second class of error identifiers and the one or more output entries to the IDE.

One aspect of the above embodiment further includes providing information corresponding to the one or more output entries to the IDE if the one or more output entries do not correspond to the first class of error identifiers and if the one or more output entries do not correspond to one of the second class of error identifiers.

Another aspect of the above embodiment further includes generating the first class of error identifiers using a set of stateless error parsers. In a further aspect, determining whether the one or more output entries correspond to the first class of error identifiers further includes generating a concatenated regular expression including each of the first class of error identifiers, and comparing each of the one or more output entries to the concatenated regular expression. In another further aspect, determining an error identifier of the first class of error identifiers corresponding to the one or more output entries further includes submitting each of the one or more output entries to an error parser of the set of stateless error parsers, and if the error parser matches a regular expression of the one or more output entries then the error identifier corresponds to the error parser.

In another aspect of the above embodiment, the second class of error identifiers corresponds to us set of stateful error parsers. In a further aspect, determining if the one or more output entries correspond to the one of the second class of error identifiers further includes submitting each of the one or more output entries to a stateful error parser of the stateful error parsers, and if the stateful error parser matches regular expressions in the one or more output entries then the one or more output entries correspond to an error identifier associated with the stateful error parser.

Another embodiment of the present invention provides for a development environment system that includes: a first system configured to provide an integrated development environment where the integrated development environment is configured to generate one or more command lines configured to generate executable code for a target processing environment; and, a second system that is communicatively coupled to the first system and provides a set of command line tools configured to process a first command line of the one or more command lines received from the first system where the processing provides a step to generate executable code for the target processing environment and generate one or more output entries, determine whether the one or more output entries corresponds to a first class of error identifiers, determine an error identifier of the first class of error identifiers corresponding to the one or more output entries and transmit information corresponding to the error identifier and the one or more output entries to the first system if the one or more output entries correspond to the first class of error identifiers, and transmit information corresponding to one of a second class of error identifiers and the one or more output entries to the first system if the one or more output entries do not correspond to the first class of error identifiers and if the one or more output entries correspond to one of the second class of error identifiers.

In one aspect of the above embodiment, the second system is further configured to transmit information corresponding to the one or more output entries to the first system if the one or more output entries do not correspond to the first class of error identifiers and if the one or more output entries do not correspond to one of the second class of error identifiers.

In another aspect of the above embodiment, the second system is configured to determine whether the one or more output entries correspond to the first class of identifiers by virtue of being further configured to generate a concatenated regular expression including each of the first class of error identifiers, and compare each of the one or more output entries to the concatenated regular expression. In a further aspect, the second system is further configured to determine an error identifier of the first class of error identifiers corresponding to the one or more output entries by virtue of being further configured to submit each of the one or more output entries to an error parser of the set of stateless error parsers, and if the error parser matches a regular expression of the one or more output entries then the error identifier corresponds to the error parser.

In another aspect of the above embodiment, the second class of error identifiers corresponds to a set of stateful error parsers. In a further aspect, the second system is configured to determine if the one or more output entries correspond to one of the second class of error identifiers by virtue of being further configured to submit each of the one or more output entries to a stateful error parser of the set of stateful error parsers, and if the stateful error parser matches regular expressions in the one or more output entries then the one or more output entries correspond to an error identifier associated with the stateful error parser.

Another embodiment provides a non-transitory computer readable medium storing instructions for generating code executable in a target processing environment. The instructions are executable by a processor and include: a first set of instructions configured to process a first command line by a first processor where the first command line is generated by an integrated development environment, and said processing the first command line executes a command line tool as a step to produce code executable by the target processing environment and generate one or more output entries; a second set of instructions configured to determine whether the one or more output entries correspond to a first class of error identifiers; a third set of instructions configured to determine an error identifier of the first class of error identifiers corresponding to the one or more output entries, and provide information corresponding to the error identifier and the one or more output entries to the IDE if the one or more output entries correspond to the first class of error identifiers; and, a fourth set of instructions configured to provide information corresponding to the one of the second class of error identifiers and the one or more output entries to the IDE if the one or more output entries do not correspond to the first class of error identifiers and if the one or more output entries correspond to one of a second class of error identifiers.

In one aspect of the above embodiment, the instructions further include a fifth set of instructions configured to provide information corresponding to the one or more output entries to the IDE, if the one or more output entries do not correspond to the first class of error identifiers and if the one or more output entries do not correspond to one of the second class of error identifiers.

In another aspect, the instructions further include a fifth set of instructions configured to generate the first class of error identifiers using a set of stateless error parsers. In a further aspect, the second set of instructions further include a six set of instructions configured to generate a concatenated regular expression including each of the first class of error identifiers, and a seventh set of instructions configured to compare each of the one or more output entries to the concatenated regular expression. In another further aspect, the third set of instructions further included eight set of instructions configured to submit each of the one or more output entries to an error parser of the set of stateless error parsers, and if the error parser matches the regular expression of the one or more output entries then the error identifier corresponds to the error parser.

In another aspect, the second class of error identifiers corresponds to a set of state full error parsers and the fourth set of instructions includes a fifth set of instructions configured to submit each of the one or more output entries to a stateful error parser of the set of stateful error parsers, and if the stateful error parser matches regular expressions and the one or more output entries then the one or more output entries correspond to an error identifier associated with the stateful error parser.

An Example Computing and Network Environment

As shown above, the present invention can be implemented using a variety of computer systems and networks. An example of one such computing and network environment is described below with reference to FIGS. 4 and 5.

Figure 4:
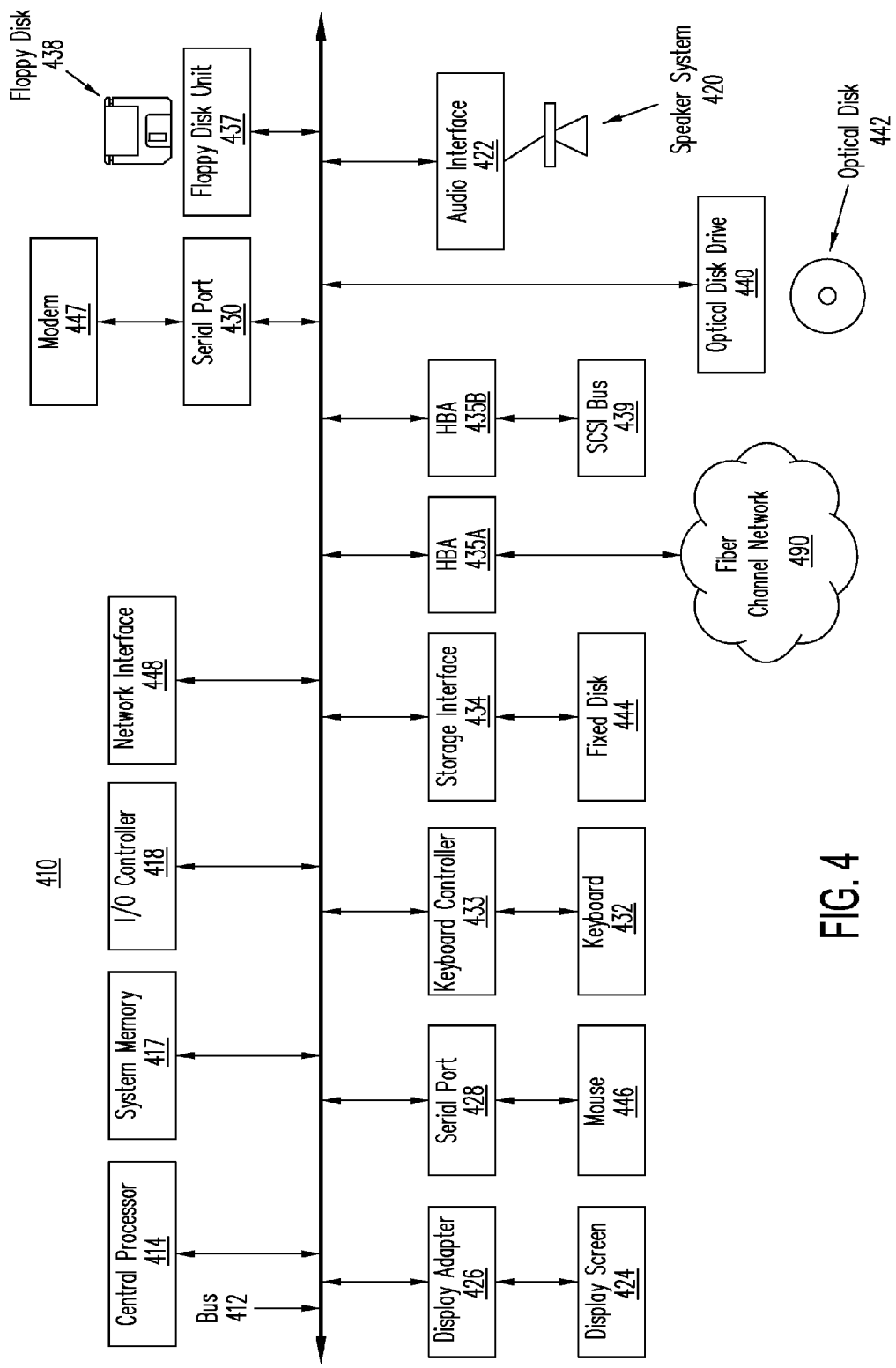
FIG. 4 is a simplified block diagram of a computer system suitable for implementing aspects of the present invention.

FIG. 4 depicts a block diagram of a computer system 410 suitable for implementing aspects of the present invention. Computer system 410 includes a bus 412 which interconnects major subsystems of computer system 410, such as a central processor 414, a system memory 417 (typically RAM, but which may also include ROM, flash RAM, or the like), an input/output controller 418, an external audio device, such as a speaker system 420 via an audio output interface 422, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440 operative to receive an optical disk 442. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer-readable medium, such as a hard disk drive (e.g., fixed disk 444), an optical drive (e.g., optical drive 440), a floppy disk unit 437, or other storage medium. Additionally, applications can be in the form of electronic signals modulated in accordance with the application and data communication technology when accessed via network modem 447 or network interface 448.

Storage interface 434, as with the other storage interfaces of computer system 410, can connect to a standard computer-readable medium for storage and/or retrieval of information, such as a fixed disk drive 444. Fixed disk drive 444 may be a part of computer system 410 or may be separate and accessed through other interface systems. Modem 447 may provide a direct connection to a remote server via a telephone link or to the Internet via an internet service provider (ISP). Network interface 448 may provide a direct connection to a remote server via a direct network link to the Internet via a POP (point of presence). Network interface 448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 4 need not be present to practice the present invention. The devices and subsystems can be interconnected in different ways from that shown in FIG. 4. The operation of a computer system such as that shown in FIG. 4 is readily known in the art and is not discussed in detail in this application. Code to implement the present invention can be stored in computer-readable storage media such as one or more of system memory 417, fixed disk 444, optical disk 442, or floppy disk 438.

Figure 5:
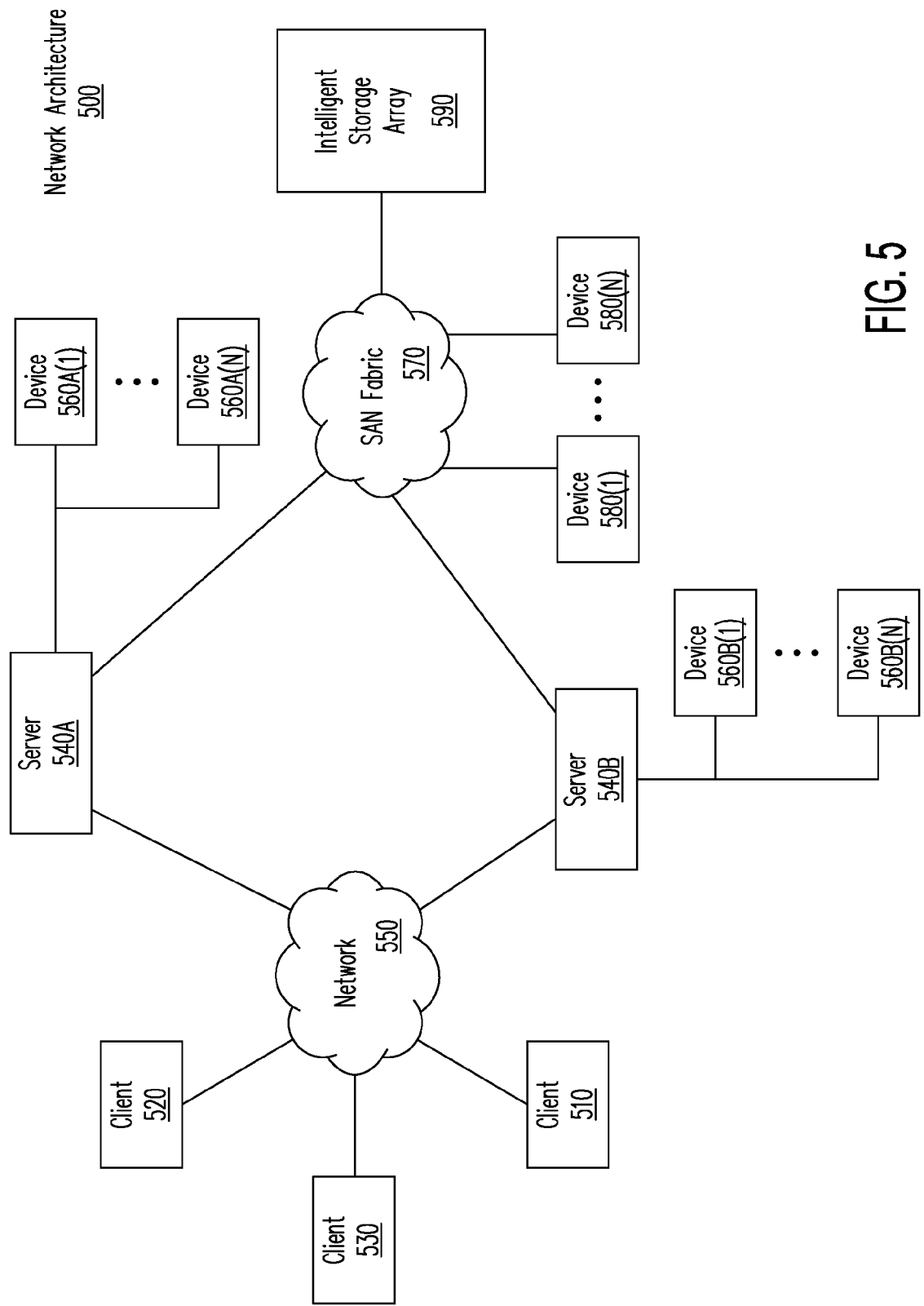
FIG. 5 is a simplified block diagram of a network architecture suitable for implementing aspects of the present invention.

FIG. 5 is a block diagram depicting a network architecture 500 in which client computer systems 510, 520 and 530, as well as storage servers 540A and 540B (any of which can be implemented using computer system 410), are coupled to a network 550. Storage server 540A is further depicted as having storage devices 560A(1)-(N) directly attached, and storage server 540B is depicted with storage devices 560B(1)-(N) directly attached. Storage servers 540A and 540B are also connected to a SAN fabric 570, although connection to a storage area network is not required for operation of the invention. SAN fabric 570 supports access to storage devices 580(1)-(N) by storage servers 540A and 540B, and so by client systems 510, 520 and 530 via network 550. Intelligent storage array 590 is also shown as an example of a specific storage device accessible via SAN fabric 570.

With reference to computer system 410, modem 447, network interface 448 or some other method can be used to provide connectivity from each of client computer systems 510, 520 and 530 to network 550. Client systems 510, 520 and 530 are able to access information on storage server 540A or 540B using, for example, a web browser or other client software (not shown). Such a client allows client systems 510, 520 and 530 to access data hosted by storage server 540A or 540B or one of storage devices 560A(1)-(N), 560B(1)-(N), 580(1)-(N) or intelligent storage array 590. FIG. 5 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 410). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future. Non-transitory computer-readable storage media include all computer-readable media, except for a transitory, propagating signal.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating code executable in a target processing environment, the method comprising:
processing a first command line by a first processor, wherein the first command line is generated by an integrated development environment (IDE), said processing the first command line executes a command line tool as a step to produce code executable by the target processing environment and generates one or more output entries;
comparing the one or more output entries to a concatenated regular expression to determine whether the one or more output entries correspond to a first class of error identifiers, wherein the concatenated regular expression comprises a complete set of trigger expressions corresponding to the first class of error identifiers;

if the one or more output entries correspond to the first class of error identifiers, then
    determining an error identifier of the first class of error identifiers corresponding to the one or more output entries, and
    providing information corresponding to the error identifier and the one or more output entries to the IDE; and
if the one or more output entries do not correspond to the first class of error identifiers and if the one or more output entries correspond to one of a second class of error identifiers, then providing information corresponding to the one of the second class of error identifiers and the one or more output entries to the IDE.

2. The method of claim 1 further comprising:
if the one or more output entries do not correspond to the first class of error identifiers and if the one or more output entries do not correspond to one of the second class of error identifiers, then providing information corresponding to the one or more output entries to the IDE.

3. The method of claim 1 further comprising:
generating the first class of error identifiers using a set of stateless error parsers, wherein a stateless error parser comprises an error parser that uses a single output line of regular expression to determine the nature of an error.

4. The method of claim 3 wherein said determining an error identifier of the first class of error identifiers corresponding to the one or more output entries comprises:
    submitting each of the one or more output entries to an error parser of the set of stateless error parsers; and
    if the error parser matches a regular expression of the one or more output entries, then the error identifier corresponds to the error parser.

5. The method of claim 1 wherein the second class of error identifiers corresponds to a set of stateful error parsers, wherein a stateful error parser comprises an error parser using multiple output lines of regular expressions to determine the nature of an error.

6. The method of claim 5 wherein said determining if the one or more output entries correspond to one of the second class of error identifiers comprises:
    submitting each of the one or more output entries to a stateful error parser of the set of stateful error parsers; and
    if the stateful error parser matches regular expressions in the one or more output entries, then the one or more output entries correspond to an error identifier associated with the stateful error parser.

7. A development environment system comprising:
a first system, comprising a first processor and a first memory, configured to provide an integrated development environment, wherein
    the first memory stores instructions executable by the first processor to provide the integrated development environment which is configured to generate one or more command lines configured to generate executable code for a target processing environment; and
a second system, comprising a second processor and a second memory and communicatively coupled to the first system, wherein the second memory stores instructions executable by the second processor to provide a set of command line tools configured to process a first command line of the one or more command lines received from the first system, wherein said processing provides a step to generate the executable code for the target processing environment and generates one or more output entries,
    compare the one or more output entries to a concatenated regular expression to determine whether the one or more output entries correspond to a first class of error identifiers wherein the concatenated regular expression comprises a complete set of trigger expressions corresponding to the first class of error identifiers,
    if the one or more output entries correspond to the first class of error identifiers, then determine an error identifier of the first class of error identifiers corresponding to the one or more output entries and transmit information corresponding to the error identifier and the one or more output entries to the first system, and
    if the one or more output entries do not correspond to the first class of error identifiers and if the one or more output entries correspond to one of a second class of error identifiers, then transmit information corresponding to the one of the second class of error identifiers and the one or more output entries to the first system.

8. The system of claim 7 wherein the second memory comprises further instructions executable by the second processor to transmit information corresponding to the one or more output entries to the first system if the one or more output entries do not correspond to the first class of error identifiers and if the one or more output entries do not correspond to one of the second class of error identifiers.

9. The system of claim 7 wherein the second memory comprises further instructions executable by the second processor to generate the first class of error identifiers using a set of stateless error parsers.

10. The system of claim 9 wherein the second memory comprises further instructions executable by the second processor to determine whether the one or more output entries corresponds to the first class of identifiers by being further configured to:
    generate a concatenated regular expression comprising each of the first class of error identifiers; and
    compare each of the one or more output entries to the concatenated regular expression.

11. The system of claim 9 wherein the second memory comprises further instructions executable by the second processor to determine an error identifier of the first class of error identifiers corresponding to the one or more output entries by being further configured to:
    submit each of the one or more output entries to an error parser of the set of stateless error parsers; and
    if the error parser matches a regular expression of the one or more output entries, then the error identifier corresponds to the error parser.

12. The system of claim 7 wherein the second class of error identifiers corresponds to a set of stateful error parsers.

13. The system of claim 12 wherein the second memory comprises further instructions executable by the second processor to determine if the one or more output entries correspond to one of the second class of error identifiers by being further configured to:
    submit each of the one or more output entries to a stateful error parser of the set of stateful error parsers; and
    if the stateful error parser matches regular expressions in the one or more output entries, then the one or more output entries correspond to an error identifier associated with the stateful error parser.

\* \* \* \* \*